United States Patent [19]

Nishikawa

[11] 4,365,885

[45] Dec. 28, 1982

[54] APPARATUS FOR REMOVING UNNECESSARY CHARGES ON A PHOTOSENSITIVE MEMBER IN AN ELECTROPHOTOGRAPHIC SYSTEM

[75] Inventor: Masaji Nishikawa, Hachioji, Japan

[73] Assignee: Olympus Optical Company Limited, Tokyo, Japan

[21] Appl. No.: 184,059

[22] Filed: Aug. 28, 1980

Related U.S. Application Data

[63] Continuation of Ser. No. 952,131, Oct. 17, 1978.

[30] Foreign Application Priority Data

Oct. 24, 1977 [JP] Japan ................................ 52-126749

[51] Int. Cl.[3] ...................... G03G 15/00; G03B 27/76

[52] U.S. Cl. ...................................... 355/3 R; 355/16; 355/71

[58] Field of Search ................... 355/3 R, 14 R, 7, 71, 355/11, 16

[56] References Cited

U.S. PATENT DOCUMENTS

| | | | |
|---|---|---|---|
| 2,481,694 | 9/1949 | Schubert et al. | 355/48 |
| 3,281,241 | 10/1966 | Mihajlov | 118/DIG. 23 |
| 3,363,555 | 1/1968 | Olden | 101/426 |
| 3,556,655 | 1/1971 | Lux et al. | 355/55 |
| 3,967,896 | 7/1976 | Looney et al. | 355/14 R |
| 4,133,609 | 1/1979 | Arai | 355/3 R |

*Primary Examiner*—R. L. Moses
*Attorney, Agent, or Firm*—Fleit & Jacobson

[57] ABSTRACT

In an electrophotographic apparatus where charges retained on a photosensitive member, which is generally, photoconductive member, are discharged and erased by illuminating the light emitted from an illuminating device on the photosensitive member. The unnecessary charges retained on the portion of the photosensitive member other than the region corresponding to the image receiving medium are removed or erased with the light illumination by controlling on and off switching of the illuminating device.

3 Claims, 10 Drawing Figures

APPARATUS FOR REMOVING UNNECESSARY CHARGES ON A PHOTOSENSITIVE MEMBER IN AN ELECTROPHOTOGRAPHIC SYSTEM

This is a continuation of application Ser. No. 952,131 filed Oct. 17, 1978.

BACKGROUND OF THE INVENTION

The present invention relates to an electrophotographic apparatus and more particularly to a device for erasing electrostatic charges on a photosensitive member for use in the electrophotographic apparatus.

An electrophotographic apparatus in which a duplicated copy is obtained by forming an electrostatic latent image on a photosensitive member such as photoconductor, visualizing the latent image by toner particles and transferring the visualized toner image on an image receiving paper, has been well known. It is also known to provide in such an electrophotographic apparatus charges that are retained on the portion of the photoconductor other than the latent image forming region are erased by illumination of light, and adhesion of toner particles to an unused portion of the photoconductor, that is, consumption of toner particles is prevented and thus the load of a cleaning device can be decreased. For example, in the Japanese Patent Laid Open No. 50,945/74 and No. 147,336/75, a light shielding means such as a shutter is provided before a light source for erasing electrostatic charges on the photosensitive member, the light shielding means is controlled and driven in accordance with a sequence of a copying device, to thereby erase the unnecessary charges on the needless portion of the photosensitive member, has been disclosed. In the Japanese Patent laid Open No. 11,139/74 means for directing the illuminating light for copy to the surface of the photoconductor is provided near the copy table, so to erase unnecessary charges on the needless portion of the photosensitive member.

In the former technique light is projected on the photosensitive member by mechanical control so that the construction of the light projection device becomes complicated as compared with only electrical control, and results in trouble and thus it is very difficult to apply the former technique to a high speed copying device which needs very high response speed. In the latter technique, it is necessary to movably provide reflecting member which directs copy illuminating light onto the surface of the photoconductor at copy table so that the construction of the directing means becomes complicated and large in size as in the former case.

An electrophotographic apparatus for obtaining a plurality of duplicated copies from electrostatic latent image once formed on the photosensitive member by only one exposure has been provided. In such apparatus, for example, use is made of a photoconductor having good charge retentive characteristics, after once forming the latent image thereon, a developing process for visualizing the latent image to a toner image, and a transfer process for obtaining the duplicated copies by transferring the thus formed toner image to an image receiving paper are repeated with each other to obtain a plurality of duplicated copies. In this case a well known transferring system such as a corona discharging transfer system, biased roller transfer system or the like is utilized for transferring the toner image formed on the photoconductor onto the image receiving system, but in any case, the portion of the photoconductor other than the region on which the image receiving paper is present is subjected to unnecessary charge by corona discharge or the voltage applied to bias roller during transfer is that the toner particles are absorbed on the unnecessarily charged portion in the next developing process. In the corona discharge transfer system, absorption of the toner particles to the portion on which no image receiving paper is present so that the consumption rate of toner particles becomes fast and the life of the cleaning device becomes short. During plural transfer processes the image receiving paper is slightly deviated to place to the unused portion of the photoconductor (other than the region of the latent image to be formed on this portion) is transferred to the periphery of the image receiving paper as a black image so that the duplicated copy becomes inferior. In the biased roller transfer system there is a very small charge which is applied to the unused portion of the photoconductor by one time of transfer, but the toner particles adhered to this unused portion are attached to the bias roller when no image receiving paper is present on the photoconductor so that the back surface of the paper becomes dirty.

SUMMARY OF THE INVENTION

The present invention has for its object the elimination of the above described drawbacks.

The present invention has for another object provision of an illuminating device for erasing electrostatic charges retained on the portion other than the region corresponding to the image receiving carrier on the photosensitive member, which has simple construction and is arranged to operate positively.

The present invention has for its further object an electrophotographic apparatus in which unnecessary consumption of the toner particles is prevented and the durability of the cleaning device is increased and thus duplicated copies having no periphery contamination and no back contamination of the image receiving paper can be obtained.

According to the present invention, an electrophotographic apparatus comprises a photosensitive member, a means for uniformly charging the photosensitive member, an optical system for forming an electrostatic latent image of a document to be copied onto the photosensitive member, an illuminating device arranged forward in the moving direction of the photosensitive member for illuminating emitted light over the region on which the latent image is at least formed in the width direction of the photosensitive member, and means for relatively moving the illuminating device and the photosensitive member, the illuminating device being switched on and off in such a manner that the light emitted from the illuminating device is projected onto the portion other than the region on which the latent image is formed thereby to erase unnecessary charges presented on said portion.

The photosensitive member is so constructed that a rotatable endless configuration is formed. The illuminating device comprises at least one discharge lamp.

The switching on and off control of the discharge lamp is realized with signals obtained by the movement of the optical system or the photosensitive member or signals obtained by detecting the image receiving paper in the conveying path thereof.

The discharge lamp is a fluorescent lamp for erasing charges presented on the portion of the photosensitive member other than the region on which the latent image is formed. The fluorescent lamp includes a light shielding member having a slit opening and the width of the region of the photosensitive member projected by the light emitted from the fluorescent lamp is defined by the width of the slit opening. The fluorescent lamp is operated by a commercial supply source and the width of the region of the photosensitive member projected by the light emitted from the fluorescent lamp is made 3 to 5 mm. The supply source for fluorescent lamp is a DC supply source or a high frequency supply source.

The illuminating device comprises in addition to the discharge lamp at least two separate light sources for illuminating a frame portion of the photosensitive member other than the region on which the latent image is formed. The switching on and off control of the fluorescent lamp is realized in accordance with the movement of the photosensitive member on which the latent image is formed and the switching on and off control of the separate light source for illuminating the frame portion other than the region on which the latent image is formed is realized in accordance with the width of the image receiving paper. The separate light source is an incandescent lamp.

The present invention is based on the recognition of the fact that in the electrophotographic apparatus of the type in which charges present on the photosensitive member, generally a photoconductor, are discharged and erased by illuminating or projecting the light on the photosensitive member, if the light emitted from the discharge lamp is projected onto the photosensitive member by the switching on and off control of the lamp itself. The charges retained on the portion of the photosensitive member other than the region corresponding to the image receiving carrier can be erased by the light illumination.

DETAILED DESCRIPTION OF THE INVENTION

Referring now to drawings there is shown one embodiment of an electrophotographic apparatus according to the present invention.

The present invention can be applied to an electrophotographic apparatus having a system of transferring on the image receiving carrier the latent images, for example, electrostatic latent image, persistent internal polarized image, persistent conductive image which are formed on the photosensitive member such as photoconductor, and have a characteristic of erasing toner absorbing force by light projection after visualized as toner image. In the embodiments hereinafter, for simplification the electrophotographic apparatus for carrying out the electrophotographic process, that is, Carlson process in which the electrostatic latent image is formed by projecting light image on the uniformly corona charged photoconductor and the toner image formed by visualizing the latent image by toner particles is transferred to the image receiving paper.

Figure 1:
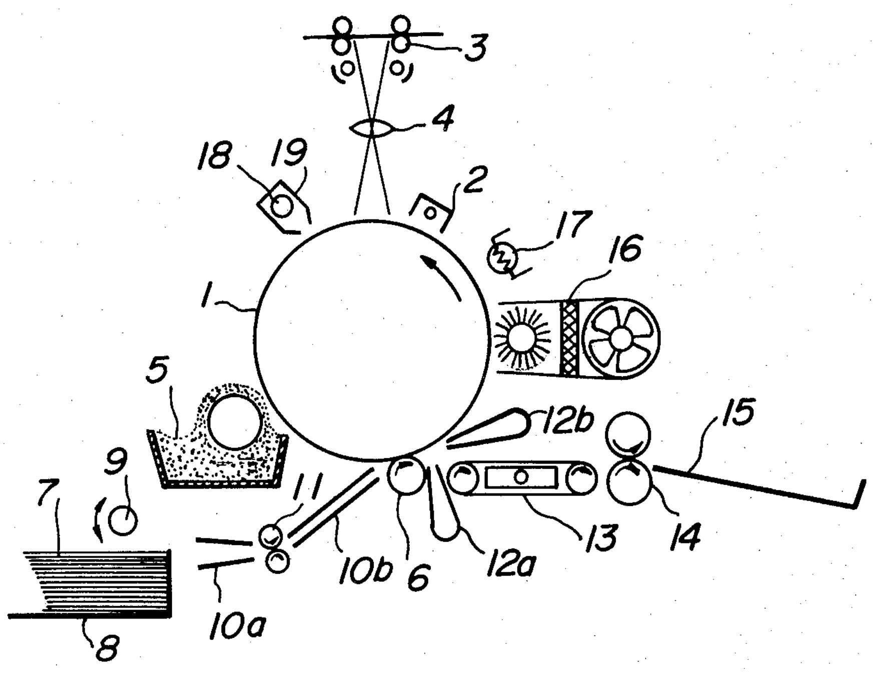
FIG. 1 is a diagrammatic view showing a construction of an electrophotographic apparatus according to the present invention.

FIG. 1 is a diagram showing the construction of one embodiment of an electrophotographic apparatus according to the present invention. The apparatus comprises a photoconductive drum 1 which is mounted to rotate in the direction of the arrow. The drum 1 is uniformly charged by a corona charger 2 so that on the whole surface of the drum 1 there is uniformly present an amount of charge which can absorb toner particles. The photoconductive drum 1 is then subjected to image projection of the document to be copied by a light image projection means consisting of a document illuminating and scanning device 3 and a projection lens 4 to selectively discharge charges in accordance with the light image, to thereby form an electrostatic latent image corresponding to the light image. The latent image is subjected to a development process by toner particles when the drum 1 passed through a development device 5 and visualized as a toner image. The toner image is transferred onto an image receiving paper 7 which is pressed and conveyed between the photoconductive drum 1 and a biased transfer roller 6.

The image receiving papers 7 are stacked in a cassette 8, drawn out one by one from the cassette 8 in synchronized with the rotation of the drum 1 and conveyed between the drum 1 and the biased transfer roller 6 through a paper guide 10*a*, a pair of feed rollers 11 and a paper guide 10*b*. The image receiving paper which is subjected to transfer of the toner image, is peeled off from the photoconductive drum 1 under an action of an absorbing and peeling off device 12*a* and a blowing and peeling off device 12*b*, conveyed to a fixing device 14 consisting of a pair of rollers through an absorbing and conveying belt 13 to fix the toner image and taken out on a tray 15 as a final duplicated copy.

After completing transfer of the toner image, the residue toner particles stayed on the surface of the drum 1 are removed by a cleaning device 16 and the drum 1 is subjected to an image erasing process by a latent image erasing lamp 17 and thus the next formation of the latent image has been enabled. In case of obtaining a plurality of duplicated copies from the electrostatic latent image once formed on the photoconductive drum 1 the development step and the transfer step are successively repeated by desired number of times after which the residue toner particles may be removed under the action of the cleaning device 16 and the latent image erasing lamp 17.

In the electrophotographic apparatus shown in FIG. 1 a discharge lamp 18 is arranged between an area of projecting the light image onto the surface of the drum 1 and the development device 5 and the light emitted from the lamp 18 is projected or illuminated in the direction intersecting perpendicular to the direction of rotation of the drum 1. The width of the light projected from the lamp 18 is preferably controlled by a lamp hood 19. The light emitted from the discharge lamp 18 is projected onto only the surface portion of the drum 1 other than the region corresponding to the size of the image receiving paper 7 in the direction of rotation of the drum 1. The signal for controlling the lighting or switching on and off of the lamp 18 can be obtained as follows. The length of the region on which the light emitted from the lamp 18 is not projected, that is, the length of the region on which the latent image is formed may be determined in accordance with the size of the image receiving paper. The signal for indicating the size of the image receiving paper can be obtained by a switch such as a microswitch operated when the cassette 8 is charged on the apparatus. In the device for holding some kinds of recording papers the size indicating signal can be obtained by manually pushing one of select buttons which designate any kinds of the image receiving papers. These signals for designating or indicating the size or the length of the image receiving paper determine the time during which the discharge lamp 18 is switched off or deenergized. The deenergizing of the discharge lamp is performed by accommodating it in a sequence which begins its operation by switching on of a copy start switch, and for example, by sensing with a microswitch or the like the predetermined position which is attained by rotation of the drum 1. Alternatively, timing clock pulses are generated in synchronized with rotation of the drum from the time of pushing the copy start switch, the number of the timing clock pulses is counted, and the enable signals are generated when the value of the counted pulses reaches to a predetermined number of the pulses thereby to deenergized the discharge lamp. The signal for switching on the discharge lamp is again obtained by selecting and generating the above described size indicating signals. For example, it is preferable to select one of signals generated from switches which are operated by a sequence table rotated with the drum and are operated with various timings corresponding to the size of various image receiving papers. Alternatively, it is preferable to select any one of preset counters set to various pulse numbers in accordance with the size of the image receiving papers thereby to determine the timing at which the discharge lamp is again switched on. These size indicating signals may be delayed to operate the discharge lamp at correct timing.

Figure 2:
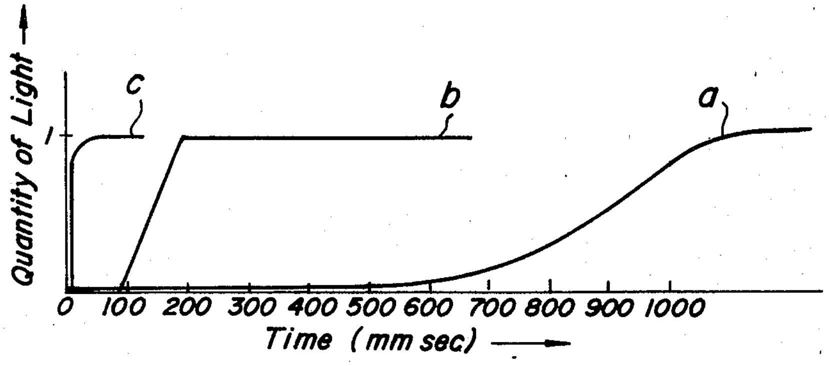
FIG. 2 is a graph showing a response characteristic of various illuminating devices.

The reason of using the discharge lamp 18 is to erase the charges retained on the area of the drum other than the region on which the latent image is formed since the illuminating light must be switched on or off at high speed in accordance with the leading edge and the trailing edge of the paper 7 during rotation of the photoconductive drum 1. For example, the portions placed at inner side of the paper 7 from its leading edge and the trailing edge may be subjected to the projection of the illuminating light since the edge portion of the document to be copied is generally a white portion. Under this condition the response speed of the illuminating light allowed at the surface speed of the drum 1 of 150 mm/sec is within 33.3 mm/sec. This speed is one obtained in the case where the illuminating light is of a linear form. If the illuminating light has a width in the direction of rotation of the drum 1, the speed must be made faster than the above speed. As shown in FIG. 2 it is preferable to use a discharge lamp as the illuminating lamp for satisfying this response speed.

Figure 3:
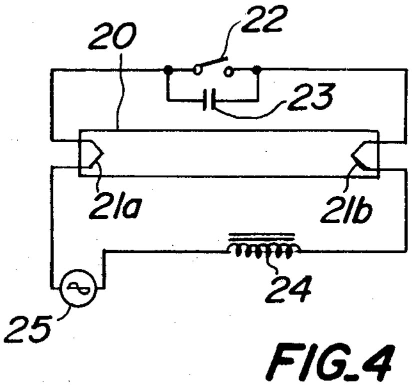
FIG. 3 is a circuit diagram showing a lighting circuit of a conventional discharge lamp.

FIG. 2 is a graph showing a lighting characteristics such as the response speed in various illuminating devices in which quantity of light is plotted on ordinate and the delay time of the signal is plotted on abscissa. In FIG. 2 the response speed of the incandescent lamp is shown by a curve a. This response speed is varied by the construction and the lighting condition of the lamp. In this embodiment, the curve a designates the lighting characteristic of the small incandescent lamp having color temperature being not rised. A curve b shows a lighting characteristic of the illuminating device consisting of a combination of a light source and a mechanical shutter. The shutter is generally drived by a solenoid or the like so that the response speed is varied by the inertia of the shutter and the force of the solenoid. The limit of the response speed is generally about 100 mmsec. Even though the response speed of the halogen lamp or the like (not shown) is faster than that of the incandescent lamp the response speed necessary to stabilization is about few hundreds mmsec. As compared with the above illuminating device the response speed of a fluorescent lamp is very fast. The response speed of the fluorescent lamp shown in FIG. 2 is a lighting characteristic of the fluorescent lamp when it is operated by the conventional lighting circuit or it is operated by the lighting circuit for an ultraviolet ray lamp, that is, a mercury vapor discharge lamp. The lighting circuit for these fluorescent lamps is shown in FIG. 3. This circuit comprises a fluorescent lamp 20 having two filaments **21*a* and 21*b* provided at its ends, a parallel combination of a starter switch 22 and a capacitor 23 which are connected between one terminal of both filaments 21*a* and 21*b*, and a series combination of a choke coil 24 and an AC supply source 25 which is connected between other terminal of the filaments 21*a* and 21*b*. In this lighting circuit the starter switch 22 is once switched on and then switched off thereafter the quantity of light of the lamp 20 reaches to about 95% within a half cycle of the voltage from the source 25 and saturates at two cycles thereof. The response of the lamp 20 is estimated as half cycle of the voltage of the source 25 and the time thereof becomes about 10 mmsec at 50 Hz of the frequency of the source 25**.

Figure 4:
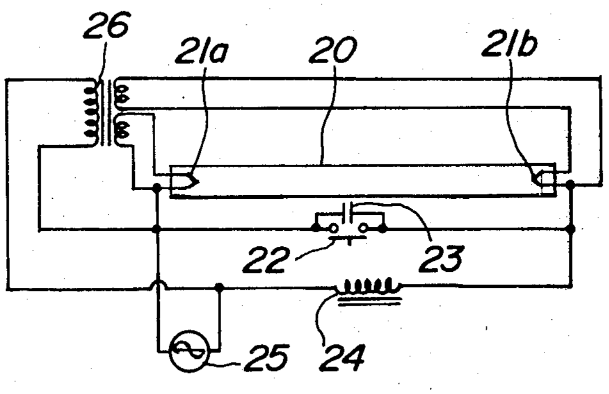
FIG. 4 is a circuit diagram showing a lighting circuit of a discharge lamp applied to the apparatus according to the present invention.

In the lighting circuit shown in FIG. 3 the directions of the current flowing through the filaments **12*a* and 12*b* are in the opposite directions with each other and thus the voltage drops caused by the currents become relatively large so that difference of the voltage drops becomes few ten volts and thus weak discharge arises between the filaments 21*a* and 21*b* at the desired latent image area. This weak discharge generates a light near the electrodes so that undesired illuminating light is projected onto the latent image area of the photoconductive drum 1 resulting in erasure of latent image. In order to prevent such erasure of latent image it is preferable to use a lighting circuit shown in FIG. 4. This lighting circuit comprises a fluorescent lamp 20 having two filaments 21*a* and 21*b* provided at its ends, a parallel combination of a starter switch 22 and a capacitor 23 which are connected between one terminal of the filaments 21a and 21b, a series combination of a choke coil 24 and an AC supply source 25 which is connected between other terminal of the filaments 21a and 21b and a heating transformer 26 connected to a primary winding of the supply source 25, two secondary windings of which are connected to the filaments 21a and 21b, respectively, to preheat these filaments. The switching on and off operation of the lamp 20 of the lighting circuit is the same as that of the lighting circuit shown in FIG. 3. That is, in the lighting circuit shown in FIG. 4 when the starter switch 22 is switched on to begin the discharge of the lamp 20 the filaments 21a and 21b are slightly heated and emitted a little light but an emission caused by the undesired discharge can effectively be prevented since the voltage difference by the voltage drops is scarcely generated between the filaments 21a and 21b and thus the response speed of the lighting can be increased by the preheating of the filaments 21a and 21**b.

As for the discharge lamp 18, it can be selected and utilized from any kinds of fluorescent lamps having various fluorescent materials; a mercury vapor discharge lamp (ultraviolet ray lamp), a Xenon lamp and a neon tube lamp or the like in accordance with the spectral sensitive characteristic of the photosensitive material which constitute the photosensitive drum 1. When the lighting circuit is applied to a high speed electrophotographic apparatus in which the photosensitive drum 1 is rotated at high speed the lighting circuit may be operated with a DC supply source or a supply source having a higher frequency than that of the commercial supply source. In any case both filaments must be preheated to prevent undesired discharge and to increase response speed.

The width of the projected light in the direction of rotation of the photosensitive drum 1, of the mechanical shutter system is such that the width relates to the on-off characteristic of the shutter. In case of the discharge lamp 18 such as fluorescent lamp being operated by an AC supply source a stripe pattern is generated by the erasing of the charges based on the emission which is repeatedly switched on and off at a cycle having a double frequency of the supply source so that the width of the projected light must be determined by taking the generation of the stripe pattern into account. The contrast of the stripe pattern becomes strong in accordance with the condition of the emission in case of the minimum width of the projected light and becomes weak as the width of the projected light is increased. In order to completely prevent the generation of the stripe pattern it is preferable to set the width of the projected light to a value of an integer multiple of a distance of the photoconductive drum 1 which is moved during one cycle of the emission. If the width of the projected light is made several times or more of the moving distance of the drum 1 instead of a precise integer multiple the generation of the stripe pattern is not a serious problem. For example, if the surface speed of the drum 1 is 150 mm/sec and the discharge lamp 18 is emitted with the commercial supply source having a frequency of 50 Hz the moving distance of the drum 1 becomes 1.5 mm at one cycle of the emission of the discharge lamp 18 and the width of the projected light determined by the lamp hood 19 may be chosen to 1.5 mm, 3 mm and 3 mm or more. As described above if the surface of the photosensitive drum 1 may be illuminated to its portion placed within about 5 mm from the leading edge and the trailing edge of the image receiving paper 7 the width of the projected light may be made about 5 mm.

As described above, in the electrophotographic apparatus according to the present invention as shown in FIG. 1, the discharge lamp 18 for illuminating light over the region on which an electrostatic latent image corresponding to at least a light image is formed, is arranged in the direction orthogonal to the direction of rotation of the photoconductive drum 1, the width of projected light of the discharge lamp 18 is properly defined or controlled by the lamp hood 19, and the discharge lamp 18 itself switches on and off and is controlled in accordance with the region of the photoconductive drum 1 corresponding to a size of the image receiving paper 7, whereby, unnecessary charges retained on the photoconductive drum 1 can effectively be removed or erased, and thus toner particles are not unnecessarily consumed and a life of the cleaning device 16 can be prolonged.

Figure 5:
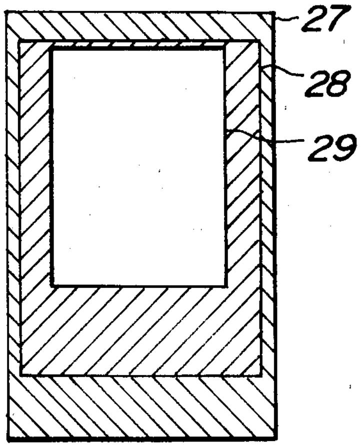
FIG. 5 is a top plan view showing various regions of a photoconductive member corresponding to various sizes of an image receiving paper in the stationary photoconductive member.

On the other hand, in a common electrophotographic apparatus, a size of the photoconductor is equal to or larger than the maximum size of an image receiving paper to be used. As the image receiving paper, use is commonly made of different sizes, such as A, E or the like. FIG. 5 is a top plan view showing one embodiment of the region corresponding to the image receiving paper having various sizes used on the photoconductor. That is, the region corresponding to a frame 28 of the size A in a photoconductor 27 does not match the region corresponding to a frame 29 of the size B, but even in case of using either size of image receiving paper, it is preferable to adhere the toner particles to only the region corresponding to the image receiving paper to be used as described above. Even in case of using the image receiving paper having the size of the frame 29 of the size B, however, the toner particles sometimes adhere to a hatched portion other than that the region, owing to various reasons which will be explained hereinafter.

(1) When a thick document such as a book or the like is copied, if a document press plate is not used or the document press plate is positioned considerably higher than the document table, no or less reflective light is obtained from anywhere other than the document portion, so that the charges of that portion cannot be removed and a large amount of the toner particles is adhered (in case of a thin document, the document table is made into contact with the document press plate, and the document press plate is made of a white member having high reflection factor, so that the hatched portion is also exposed and the toner particles are not adhered to that portion).

(2) In case that the portion of the document corresponding to the image receiving paper is illuminated and the other portion is exposed by means of a quick-back machine for the document table, if a length of the image receiving paper is short, a large amount of the toner particles is adhered to the hatched portion in the longitudinal direction of the photoconductor 27 which interrupts exposure.

(3) In case of obtaining a plurality of duplicated copies from the electrostatic latent image formed by one exposure, the charges are given to the hatched portion where no image receiving paper is present in the transfer step, and a large amount of the toner particles is adhered to this portion in the next developing step. A considerably large amount of charges is adhered to the hatched portion in a corona discharge transfer system, while the amount is comparatively less in a biased roller transfer system or any similar transfer system but a large amount of charges is accumulated after a large number of transfer.

The toner particles adhered to the unnecessary portion become large in area and amount, as compared with the toner particles in the frame 29 of the size B for forming letters and diagrams so as to accelerate consumption of the toner. Further, in the transfer step, the toner in the frame 29 of the size B is very small because of transfer to the image receiving paper, while the toner particles of the hatched portion are considerably large because of the developed total toner. Therefore, the load of the cleaning device is increased, the filter is often clogged and a life of the apparatus is shortened. Further, in the biased roller transfer system, the toner particles at the hatched portion adhere to the roller to spoil the back surface of the image receiving paper or to scatter the toner particles in the electrophotographic apparatus.

Figure 6:
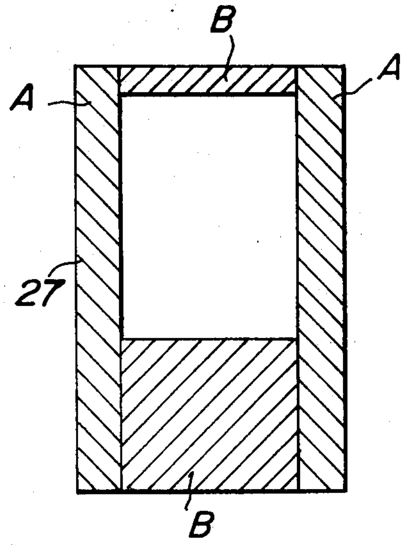
FIG. 6 is a top plan view showing various regions to be erased for unnecessary charges of the movable photoconductive member.

FIG. 6 is a top plan view showing the region to be illuminated when the photoconductor is made movable by distinguishing it by its character. That is, the region shown by a symbol A is a range to be illuminated uniformly over the moving direction (arrow) of the photoconductor 27, determined by a width of the image receiving paper, which is the image frame portion constantly projected by illuminated light for erasing unnecessary charges as far as the image receiving paper having the same width is used. The region shown by a symbol B is a range where illuminated light should be switched on and off for charge erasure by corresponding the top end to the rear end of the image receiving paper during the movement of the photoconductor 27, and a quick response speed of switching on and off of illuminated light is required. As to the charge erasure of this region B, as well as the electrophotographic apparatus shown in FIG. 1, a discharge lamp for irradiating light over the region for forming the electrostatic latent image is arranged in the direction orthogonal to the moving direction of the photoconductor 27 and this discharge lamp is switching on and off controlled. However, light irradiation to each charge erasure region of the image frame portion A and the region B cannot be carried out by arranging one long discharge lamp for irradiating light over the whole width of the photoconductor 27. In order to carry out this, as the discharge lamp, use is made of a short neon tube or the like. A plurality of these short neon tubes are aligned in the widthwise direction of the photoconductor 27, and each tube is separately lighted. However, since the neon tube has a comparatively small quantity of light and the spectrowave-length characteristic of the emission cannot be selected it can be used only when the photoconductor 27 is very sensitive or its moving speed is very low. On the other hand, a long discharge lamp such as fluorescent lamps, ultraviolet ray sterilizing lamps and the like has large quantity of light, wide selection width of spectrowave-length characteristic of the emission, good response and cheap.

Figure 7:
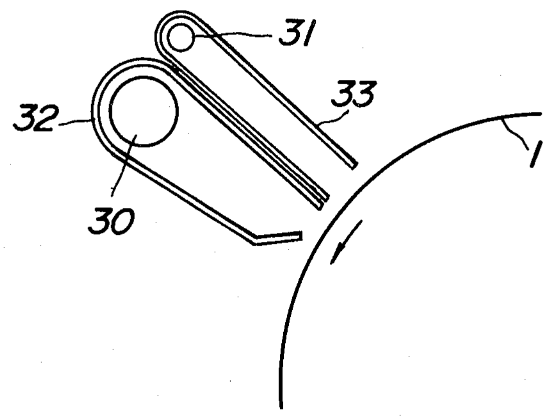
FIG. 7 is a diagrammatic view showing a construction of an illuminating device used in the apparatus according to the present invention.
Figure 9:
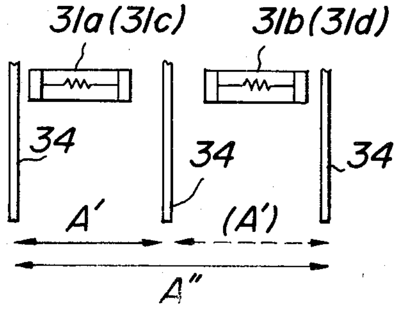
FIGS. 9 and 10 are explanatory views showing arrangements of incandescent lamps used in the illuminating device according to the present invention.
Figure 10:
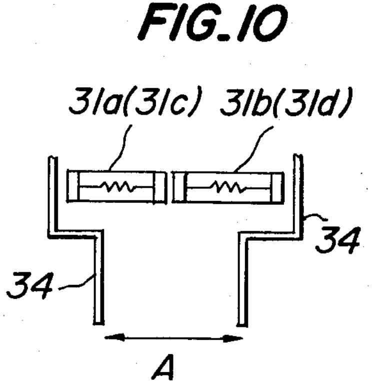

In order to properly remove the charge given to the image frame portion A and the region B shown in FIG. 6 with the use of such discharge lamp, it is preferable to construct the illumination device as shown in FIG. 7. In addition, the electrophotographic apparatus according to the invention shown in FIG. 7 only differs from that shown in FIG. 1 in the construction of the illumination device. That is, a discharge lamp 30 for irradiating the region B (refer to FIG. 6) and a incandescent lamp 31 for irradiating the image frame portion A (refer to FIG. 6) are arranged in parallel with each other in the direction orthogonal to the rotating direction of the photoconductive drum 1 and these irradiating region and width are controlled by lamp hoods 32, 33, respectively. In addition, the range of arranging the discharge lamp 30 and the incandescent lamp 31 is same as that where the discharge lamp 18 is arranged as shown in FIG. 1, but in this case, the discharge lamp 30 has a length for irradiating the whole region of the photoconductive drum 1 and the incandescent lamp 31 has a length for irradiating the image frame portion A only. Further, as explained with reference to FIG. 5, in case of using various image receiving papers having different sizes, as shown in a plan view of FIG. 8, a plurality of incandescent lamps 31*a*, 31*b* and 31*c*, 31*d* are arranged in the image frame portion and selectively lighted in accordance with the width of the image receiving paper to be used. In addition, in order to selectively light the incandescent lamps in accordance with the paper width, provision is made of a signal of image receiving paper selection manually selected in a panel screen and the like of the electrophotographic apparatus or a signal obtained from the image receiving paper cassette 8 (refer to FIG. 1) and an image receiving paper sensing device for sensing the paper width in a path of the image receiving paper conveyer so as to control the selective lighting based on the sensing signal. Further, in case of selectively lighting a plurality of incandescent lamps in accordance with the paper width, as shown in FIG. 9, each of the incandescent lamps 31*a*, 31*b* and 31*c*, 31*d* is partitioned by a shield plate 34, and when the image frame portion A' is irradiated, the incandescent lamp 31*a* (31*d*) is lighted, and when the image frame portion A'' is irradiated, the incandescent lamps 31*a*, 31*b* (31*c*, 31*d*) are simultaneously lighted. In order to make a distribution of the irradiation light strength on the image frame portion uniform, as shown in FIG. 10 for instance, the end portion of the irradiation region A is partitioned by the shield plate 34, the incandescent lamps 31*a*, 31*b* (31*c*, 31*d*) are arranged near the end portion within the partitioned region and these lamps are simultaneously lighted. With the arrangement shown in FIG. 10, however, if the incandescent lamp 31*a* (31*c*) or 31*b* (31*d*) is independently lighted, irradiation light is reduced but its region is not changed.

As described above, the small incandescent lamp 31 is preferable for irradiating a comparatively narrow region such as the image frame portion. Further, its response speed is considerably slow as compared with the discharge lamp as explained in FIG. 2, but its control is determined in accordance with the paper width of the image receiving paper to be used, so that the small incandescent lamp is fully usable. Thus, illumination of the image frame portion does not seriously require a response speed, so that when changing the paper width, it is possible to arrange shielding means such as shutter and the like in front of the light source in addition of the selective lighting of a plurality of incandescent lamps 31 as described above. Further, instead of the incandescent lamps, discharge lampes similar to the discharge lamp 30 are arranged, and if these discharge lamps are long, it is possible to illuminate the image frame portion by an optional width by combining the partial shielding with the shutter.

Figure 8:
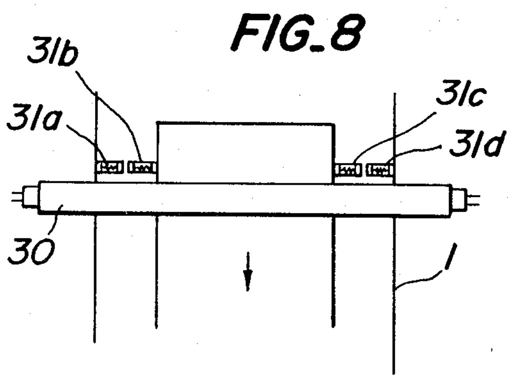
FIG. 8 is an explanatory view showing another embodiment of the illuminating device according to the present invention.

In FIGS. 7 and 8, the discharge lamp 30 is controlled in the same manner as the discharge lamp 18 shown in FIG. 1. Therefore, in the electrophotographic apparatus according to the invention shown in FIGS. 7 and 8, even in case of using an image receiving paper having a different size, the charge retained on the portion of the photoconductive drum 1 other than the region corresponding to the size of the image receiving paper can properly be removed or erased, so that the consumption of toner particles and the increased load of the cleaning device can effectively be prevented.

In addition, in the above described electrophotographic apparatus according to the invention, there is required the quantity of light sufficient enough to remove charges formed by the charging device 2 (refer to FIG. 1) and to erase these charges to an extent where the toner particles are not adsorbed. In case of obtaining a plurality of duplicated copies from an electrostatic latent image formed by one exposure, if the corona discharge transfer system is employed, the quantity of light is about same for the purpose of removing a large amount of charges given to the surface of the photoconductive drum except the time when it is made into contact with the image receiving paper during transfer and it is necessary to erase the unnecessary charge every time in accordance with the transfer of a toner image. Further, if the biased roller transfer system is employed, the charges given to an undesirable portion of the photoconductive drum are comparatively small during transfer, so that it is preferable to weaken the quantity of light for charge erasure corresponding to the transfer of the toner image or to erase charges at a rate of once every transfer. However, reduction of quantity of light becomes a serious problem when there is used a photoconductive material which causes any characteristic change by light. Therefore, in this case, it is preferable to reduce the number of light irradiation for charge erasure. For instance, the biased roller transfer system in which, a semiconductive roller is used, and a transferring voltage of about 500 volts is supplied thereto, an object can fully be attained by erasing charges at a rate of one every 10–20 transfers. On the other hand, in case of obtaining a plurality of duplicated copies by one exposure, if only the charges given by transfer are erased, the discharge lamp and the other light source are arranged between the transfer step and the next developing step.

As described above, according to the present invention, the charges retained on the portion of the photosensitive member other than the region corresponding to the image receiving medium can positively be removed with a simple construction, so that unnecessary consumption of the toner particles can effectively be prevented, while the load of the cleaning device can be mitigated, and as a result, its life can be prolonged. Further, in case of obtaining a plurality of duplicated copies by one exposure, stains around the image receiving medium and back thereof can effectively be prevented.

In addition, the present invention is not limited to the above embodiment but can be modified variously. For instance, the discharge lamps 18, 30 for removing the undesired charges retained on the photoconductive drum 1 can be co-used with the latent image erasing lamp 17 for erasing the electrostatic latent image on the photoconductive drum 1 for the purpose of carrying out the next latent image formation. In this case, in order to use the discharge lamps 18, 30 as a latent image erasing lamp, the lamp is operated for necessary hours based on a signal obtained at the time of completing transfer. This can be applied to the other electrophotographic apparatus. Further, in case that the method for forming a latent image on the photosensitive member uses a persistent conductivity effect by light and the like, the illuminating device comprising the above described discharge lamp and the like is arranged at the position before the step of uniformly charging the photosensitive member, and then the charges given to the undesired portion can effectively be removed. Further, in case of using another latent image forming method, it is possible to operate the corona charge eraser simultaneously with light irradiation for charge erasure such as the discharge lamp and the like. In the electrophotographic apparatus by forming an electrostatic latent image on the photoconductor, transferring it to an intermediate image forming medium, developing it into a toner image and transferring this toner image to an image receiving medium, if light irradiation is carried out from an illuminating device consisting of the discharge lamp and the like to the photoconductor, the unnecessary charges thereon can be removed and if the intermediate image forming medium is composed of a photosensitive insulating material such as PVK and the like, light irradiation from the illuminating device consisting of the discharge lamp and the like is applied to the intermediate image forming medium, and the unnecessary charges given thereto can effectively be removed. Further, in case of obtaining a plurality of duplicated copies by one exposure, the charges unnecessarily given in the transfer step are removed by means of the illuminating device for erasing charges during the transfer step, which can be co-used as that operated when a latent image is formed.

What is claimed is:

1. An electrophotographic apparatus comprising:

an endless photosensitive member arranged movably at a constant speed;

means for uniformly charging the photosensitive member;

means for projecting an image of a document to be copied onto the uniformly charged photosensitive member to form an electrostatic charge latent image;

first lamp means for illuminating at least one side edge of the photosensitive member in a non-pictorial area to remove undesired charge thereon;

second lamp means for illuminating a non-pictorial area of the photosensitive member between a rear edge and a front edge of the photosensitive member viewed in the moving direction thereon, said second lamp means including an elongated discharge lamp extending in the direction transverse to the moving direction of the photosensitive member;

said first and said second lamp means having an intensity lower than that associated with said projecting means during the formation of the latent image;

developing means for developing the latent image with toners to produce a toner image;

transferring means for transferring the toner image onto an image receiving means, said transferring means including a biased transfer roller and a member for biasing the image receiving means;

fixing means for fixing the tansferred toner image onto the image receiving means to form a copy;

means for repeatedly activating said developing, transferring and fixing means for the same and single latent image once formed on the photosensitive member to form a plurality of copies;

means for erasing the latent image after a given number of copies have been formed; and means for controlling said first and second lamp means during a formation of a plurality of copies in such a manner that undesired charge injected from the biased transferring means onto the non-pictorial areas of the photosensitive member is removed photoelectrically.

2. An electrophotographic apparatus comprising:

an endless photosensitive member arranged movably at a constant speed;

means for uniformly charging the photosensitive member;

means for projecting an image of a document to be copied onto the uniformly charged photosensitive member to form an electrostatic charge latent image;

first lamp means for illuminating at least one side edge of the photosensitive member in a non-pictorial area to remove undesired charge thereon;

second lamp means for illuminating a non-pictorial area of the photosensitive member between a rear edge and a front edge of the photosensitive member viewed in the moving direction thereon, said second lamp means including an elongated discharge lamp extending in the direction transverse to the moving direction of the photosensitive member;

means for activating said first and said second lamp means every time a predetermined number of copies is formed;

developing means for developing the latent image with toners to produce a toner image;

transferring means for transferring the toner image onto an image receiving means, said transferring means including a member for biasing the image receiving means;

fixing means for fixing the transferred toner image onto the image receiving means to form a copy;

means for repeatedly activating said developing, transferring and fixing means for the same and single latent image once formed on the photosensitive member to form a plurality of copies;

means for erasing the latent image after a given number of copies have been formed; and means for controlling said first and second lamp means during a formation of a plurality of copies in such a manner that undesired charge injected from the biased transferring means onto the non-pictorial areas of the photosensitive member is removed photoelectrically.

3. An electrophotographic apparatus comprising:

an endless photosensitive member arranged movably at a constant speed;

means for uniformly charging the photosensitive member;

means for projecting an image of a document to be copied onto the uniformly charged photosensitive member to form an electrostatic charge latent image;

first lamp means for illuminating at least one side edge of the photosensitive member in a non-pictorial area to remove undesired charge thereon;

second lamp means for illuminating a non-pictorial area of the photosensitive member between a rear edge and a front edge of the photosensitive member viewed in the moving direction thereon, said second lamp means including an elongated discharge lamp extending in the direction transverse to the moving direction of the photosensitive member;

said first and said second lamp means including a single elongated discharge lamp and a movable shutter which can selectively shield a central portion of the light flux emitted from the discharge lamp;

developing means for developing the latent image with toners to produce a toner image;

transferring means for transferring the toner image onto an image receiving means, said transferring means including a member for biasing the image receiving means;

fixing means for fixing the transferred toner image onto the image receiving means to form a copy;

means for repeatedly activating said developing, transferring and fixing means for the same and single latent image once formed on the photosensitive member to form a plurality of copies;

means for erasing the latent image after a given number of copies have been formed; and means for controlling said first and second lamp means during a formation of a plurality of copies in such a manner that undesired charge injected from the biased transferring means onto the non-pictorial areas of the photosensitive member is removed photoelectrically.

* * * * *